(12) United States Patent
Serrurier (10) Patent No.: US 11,898,588 B2
(45) Date of Patent: Feb. 13, 2024

(54) COMPACTOR TIP WITH HEATED RETENTION BOLT

(71) Applicant: Caterpillar Inc., Peoria, IL (US)

(72) Inventor: Douglas C. Serrurier, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 1024 days.

(21) Appl. No.: 16/801,292

(22) Filed: Feb. 26, 2020

(65) Prior Publication Data

US 2021/0262512 A1 Aug. 26, 2021

(51) Int. Cl.
*F16B 33/00* (2006.01)
*E02D 3/026* (2006.01)
*B60B 15/08* (2006.01)

(52) U.S. Cl.
CPC ............ *F16B 33/002* (2013.01); *B60B 15/08* (2013.01); *E02D 3/0265* (2013.01)

(58) Field of Classification Search
CPC ..... F16B 33/002; E02D 3/0265; B60B 15/02; B60B 15/023; B60B 15/025
See application file for complete search history.

(56) References Cited

U.S. PATENT DOCUMENTS

| | | | | |
|---|---|---|---|---|
| 1,156,471 A | * | 10/1915 | Elliot | B60B 15/025 301/52 |
| 1,644,536 A | * | 10/1927 | McGregor | B60B 15/02 301/44.3 |
| 1,748,190 A | * | 2/1930 | Ronaldson | B60B 15/02 301/44.3 |
| 1,963,686 A | * | 6/1934 | Simpson | B60B 15/025 301/44.3 |
| 2,188,196 A | * | 1/1940 | Wanek | B60B 15/025 244/103 S |
| 2,204,650 A | * | 6/1940 | Benjamin | B60B 15/025 301/50 |
| 4,668,122 A | * | 5/1987 | Riddle | E02D 3/026 172/554 |
| 5,217,321 A | * | 6/1993 | Corcoran | E02D 3/026 172/554 |
| 5,358,355 A | | 10/1994 | Brockway | |
| 5,795,097 A | * | 8/1998 | Caron | B60C 7/102 404/124 |
| 6,682,262 B2 | * | 1/2004 | Caron | E02D 3/026 404/124 |
| 6,712,551 B2 | * | 3/2004 | Livesay | B60B 15/025 404/124 |

(Continued)

FOREIGN PATENT DOCUMENTS

JP 2014220224 A * 11/2014 ............ B23P 19/068

OTHER PUBLICATIONS

Machine translation of JP 2014220224, 15 pages. (Year: 2014).*

*Primary Examiner* — Jason R Bellinger (57) ABSTRACT

A tip assembly includes a tip including a body having a narrow tip portion, a broad attachment portion that defines a concave surface, an interior disposed between the broad attachment portion and the narrow tip portion, and a cavity that leads from the concave surface toward the interior. A retention bolt that is heated includes a tapered region, and a shaft extending from the tapered region, terminating at an externally threaded end. The cavity of the tip is at least partially complimentarily shaped to the tapered region of the retention bolt.

22 Claims, 7 Drawing Sheets

(56) References Cited

U.S. PATENT DOCUMENTS

| | | | | |
|---|---|---|---|---|
| 7,108,452 B2* | 9/2006 | Caron | ............... | E02D 3/026 |
| | | | | 404/124 |
| 7,140,825 B2 | 11/2006 | Takahashi et al. | | |
| 7,739,782 B2* | 6/2010 | Denham | ............... | F16B 37/068 |
| | | | | 411/548 |
| 8,333,439 B2* | 12/2012 | Gibbins | ............... | E02F 9/2841 |
| | | | | 301/44.3 |
| 2002/0114667 A1* | 8/2002 | Kaldenberg | ............ | E02D 3/026 |
| | | | | 404/124 |
| 2009/0045669 A1 | 2/2009 | McPhail et al. | | |
| 2013/0075456 A1 | 3/2013 | Hinrichsen et al. | | |
| 2019/0093298 A1 | 3/2019 | McCartney | | |

* cited by examiner

COMPACTOR TIP WITH HEATED RETENTION BOLT

TECHNICAL FIELD

The present disclosure relates to compactor machines used to compact trash and debris in landfills, and the like. Specifically, the present disclosure relates to a compactor wheel with tips attached to the compactor wheel used on a compactor machine and the like.

BACKGROUND

Work machines known as compactors are commonly used to compress and spread material, such as trash in a landfill or dirt at a building site. Compactors often have drum-type metal wheels with a plurality of rows of replaceable teeth attached to the outside surfaces of the wheels. The teeth provide traction to the compactor, as well as concentrating the weight of the machine on a small area to increase compression force on the underlying material.

The tips are generally attached to the outside surface of the compactor wheel by welding or other type of permanent attachment since fastening connections may become loose over time, necessitating unwanted maintenance. However, such permanent attachments are time consuming and/or costly to do and make it difficult to replace the tip(s) when needed or desired.

U.S. Pat. Application Publication No. 2013075456A1 discloses a method of forming a wheel tip assembly for a compactor wheel assembly used on a compactor machine. The method may include forming a tip portion of white cast iron, and forming a base portion configured to be connected to a wheel rim. The tip portion may be brazed to the base portion to thereby form the wheel tip assembly. Also disclosed is a method of forming a compactor wheel assembly for use on a compactor machine, which includes the wheel tip assembly.

However, this publication does not address the need to replace a tip or reduce the time and/or cost of replacing the tip.

SUMMARY

A compactor wheel assembly according to an embodiment of the present disclosure may comprise an outside surface including an annular configuration that defines a radial direction, a circumferential direction, an axis of rotation, and an aperture extending radially through the outside surface, and a tip that defines an exterior, an interior, and a cavity that extends from the interior to the exterior that is aligned with the aperture of the outside surface. Also, a heated or cooled retention bolt may be disposed in the cavity of the tip that extends from the cavity of the tip through the aperture of the outside surface. The retention bolt may further include an enlarged end that is disposed in the cavity, and the cavity may include an enlarged interior portion that is configured to receive the enlarged end of the retention bolt.

A tip assembly according to an embodiment of the present disclosure may include a tip with a body having a narrow tip portion, a broad attachment portion that defines a concave surface, an interior disposed between the broad attachment portion and the narrow tip portion, and a cavity that leads from the concave surface toward the interior. A retention bolt may be configured to be heated and may include an enlarged end and a shaft extending from the enlarged end terminating at an externally threaded end. The cavity of the tip is configured to receive the enlarged end of the retention bolt.

A method for attaching a tip to a compactor wheel assembly according to an embodiment of the present disclosure may comprise attaching a retention fastener to a tip, inserting the retention fastener through an outside surface, and heating or cooling a component of the compactor wheel assembly.

A retention bolt according to an embodiment of the present disclosure may comprise an enlarged end and a shaft extending from the enlarged end terminating at an externally threaded end, and a heat transfer element contacting the externally threaded end.

A tip according to an embodiment of the present disclosure may comprise a body including a narrow tip portion, a broad attachment portion that defines a concave surface, an interior disposed between the broad attachment portion and the narrow tip portion, and a cavity that leads from the concave surface toward the interior, the cavity have an enlarged portion.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100"

etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a compactor machine, a compactor wheel assembly, a tip assembly, and a method for attaching a tip to a compactor wheel assembly according to various embodiments of the present disclosure will now be described. In some embodiments, the various components are made from various steel alloys, allowing them to be durable, expand, and contract with temperature.

Figure 1:
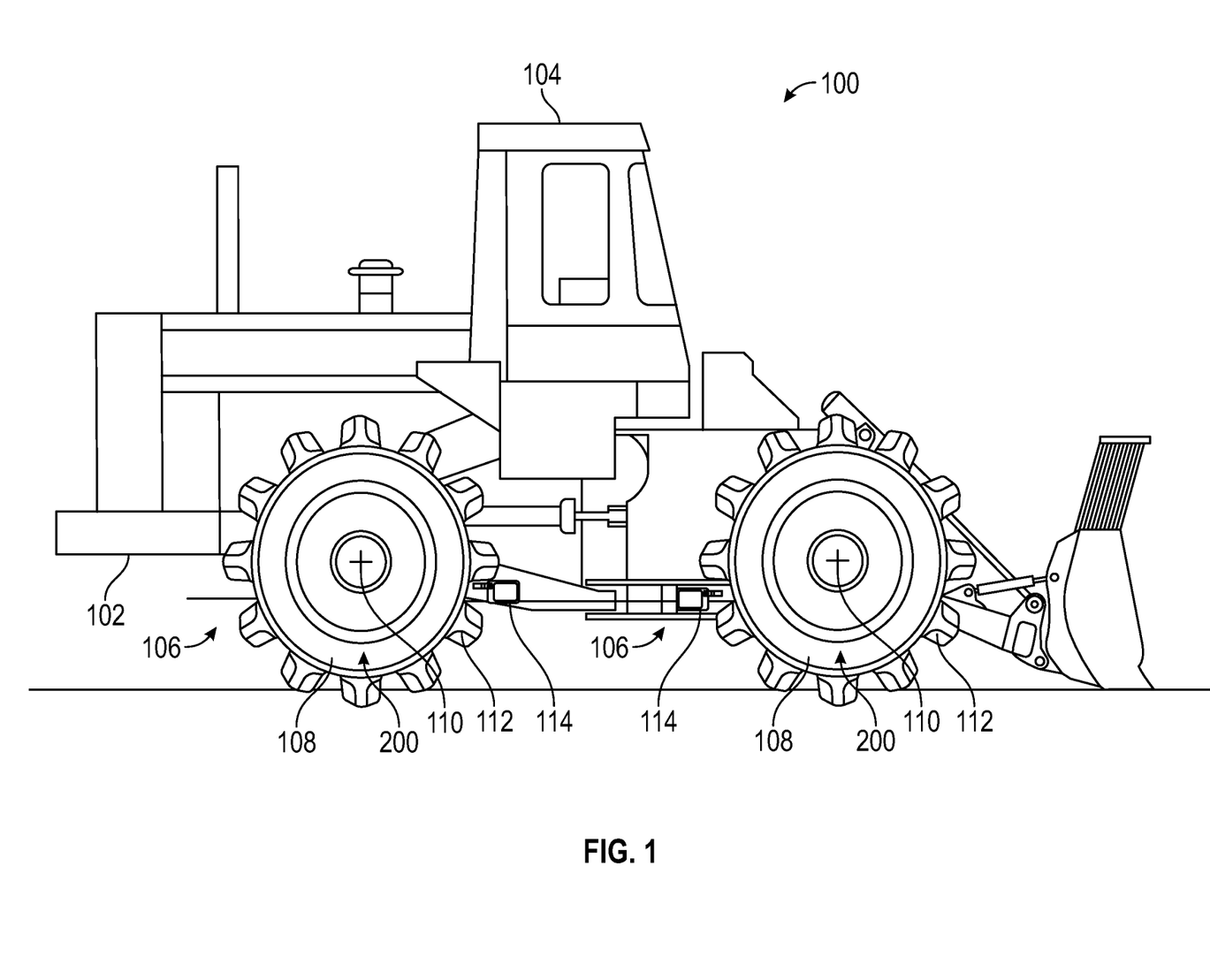
FIG. 1 is a front view of a compactor machine using a compactor wheel with a tip attached to the outside surface of the compactor wheel using a heated retention bolt (not shown) according to an embodiment of the present disclosure.

Referring first to FIG. 1, a work machine 100 includes a machine body 102, an operator compartment 104 carried by the machine body 102, and a ground-engaging system (shown generally at 106) providing motive power to the machine body 102. The ground-engaging system 106 (may also be referred to as an undercarriage) includes at least one wheel 108 having a wheel axis (shown end-on at 110). At least one compactor tooth 112 (may also be referred to as a tip) is attached to the wheel 108. Preferably, a plurality of compactor teeth 112 are arranged in circumferential rows (e.g. see FIG. 2). The wheel 108 may oscillate or rotate as the work machine 100 travels. The ground-engaging system 106 may also include at least one wheel cleaner assembly 114. The wheel 108 may take the form of a compactor wheel assembly 200 as will be discussed in further detail momentarily.

The wheel cleaner assembly 114 may be mounted in front of or behind the wheel 108. In addition, multiple wheel cleaner assemblies 114 can be associated with each wheel 108. Furthermore, each wheel cleaner assembly 114 may be mounted at any suitable angle with respect to the wheel axis 110. The configuration shown in FIG. 1 is for exemplary purposes only but indicates that this angle may be substantially horizontal for some embodiments. In other embodiments, the wheel cleaner assembly 114 may be omitted altogether.

Figure 2:
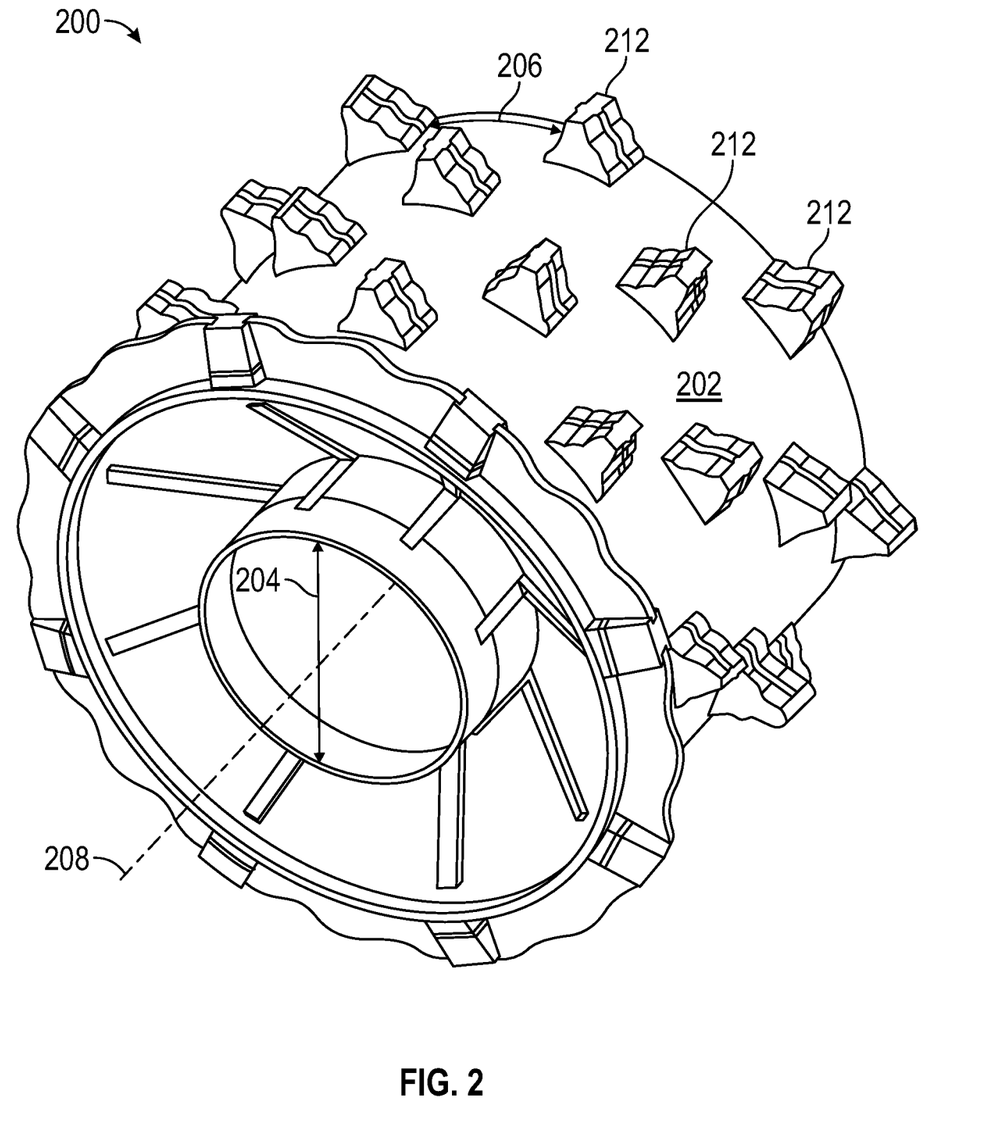
FIG. 2 is a perspective view of a compactor wheel, the tip and the retention bolt (not shown) removed from the compactor machine of FIG. 1.
Figure 3:
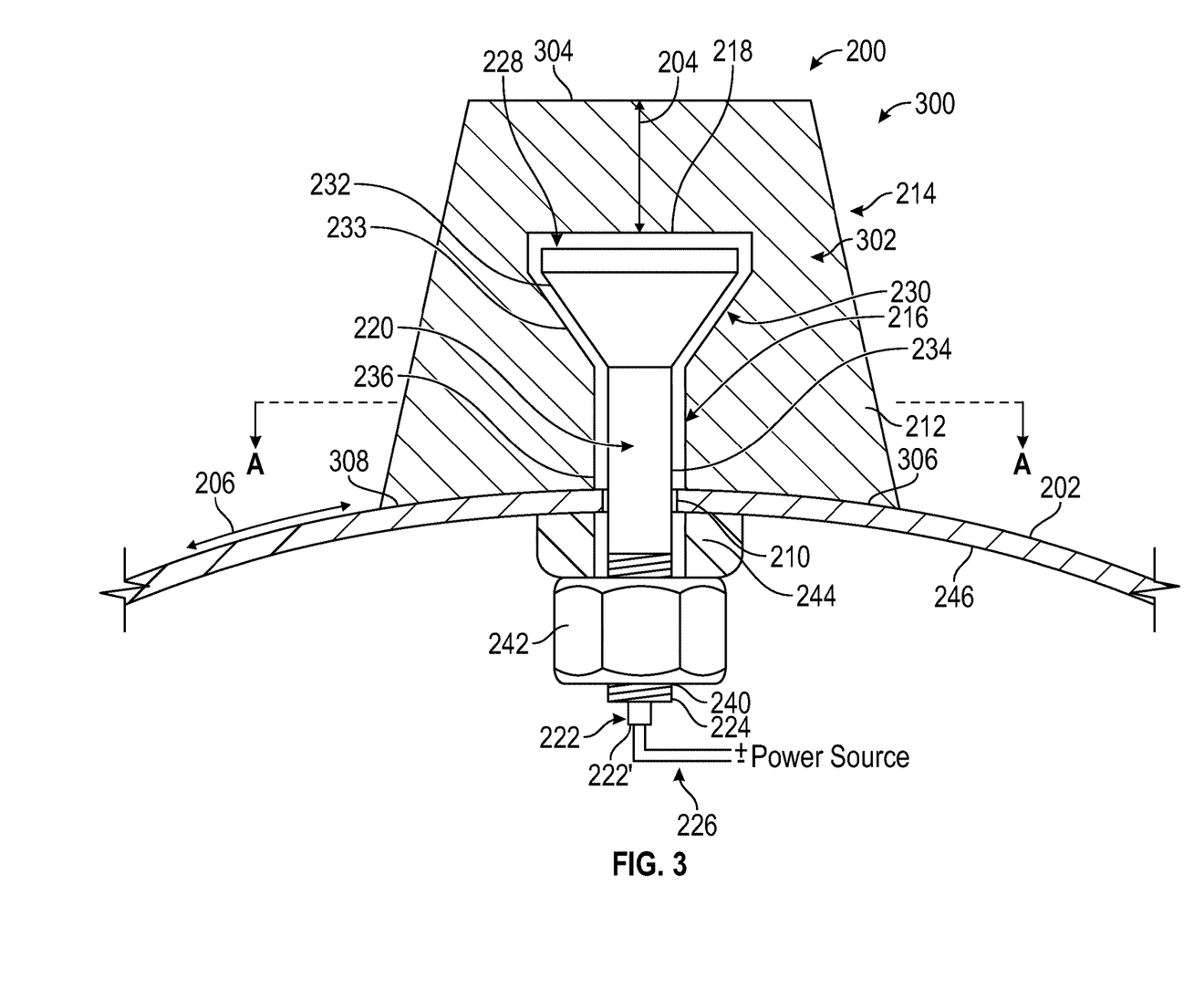
FIG. 3 is a partial sectional view of the compactor wheel, tip, and heated retention bolt of FIG. 2.

Looking at FIGS. 2 and 3, a compactor wheel assembly 200 according to an embodiment of the present disclosure may comprise an outside surface 202 having an annular configuration (e.g. cylindrical or conical annular configuration, etc.) that defines a radial direction 204, a circumferential direction 206, an axis of rotation 208, and an aperture 210 (best seen in FIG. 3) extending radially through the outside surface 202.

Referring to FIG. 3, a tip 212 may also be provided that defines an exterior 214, an interior 216, and a cavity 218 that extends from the interior 216 to the exterior 214 that is aligned (e.g. both axially and radially) with the aperture 210 of the outside surface 202. The tip may be manufactured from a cast steel, etc.

A heated or cooled retention bolt 220 may be disposed in the cavity 218 of the tip 212 that extends from the cavity 218 of the tip 212 through the aperture 210 of the outside surface 202.

For example, the compactor wheel assembly 200 may further comprise a heat transfer element 222 that is disposed in the free end 224 of the retention bolt 220. This heat transfer element may take the form of a cooling pipe that is cooled by the cooling system of the work machine 100 to increase the load exerted by the retention bolt 220 for clamping the tip 212 onto the outside surface 202 by shrinking the retention bolt 220 after the tip 212 has been attached to the outside surface 202.

Alternatively, the heat transfer element 222 may take the form of an induction heating element 222' with an electrical conduit 226 (e.g. a wire, a cable, etc.) that is connected to the induction heating element 222'. In such a case, the retention bolt 220 may be heated before the assembly process is complete to lengthen the retention bolt so that once the assembly process is complete, the heating may be removed. This allows the retention bolt to contract, increasing the clamping force exerted by the retention bolt onto the tip.

With continued reference to FIG. 3, the retention bolt 220 (manufactured via cast steel or cast iron, etc.) may include an enlarged end 228 that is disposed in the cavity 218. The cavity 218 may include an enlarged interior portion 230 that is at least partially complimentarily shaped to the enlarged end 228 of the retention bolt 220 for mating therewith so that the retention bolt 220 may engage the tip 212 to hold the tip 212 onto the outside surface 202.

More specifically, the enlarged end 228 of the retention bolt 220 may include a tapered portion 232 (e.g. a tapered conical portion, a tapered prismatic portion that has flat sides, etc.) and the enlarged interior portion 230 of the cavity 218 includes an interior tapered portion 233 that is at least partially complimentarily shaped to engage the tapered portion 232 of the retention bolt.

In some embodiments, the tapered portion 232 includes flat sides and the cavity 218 extends all the way to the side of the tip 212. In such a case, the retention bolt may include a cylindrical shaft.

Figure 4:
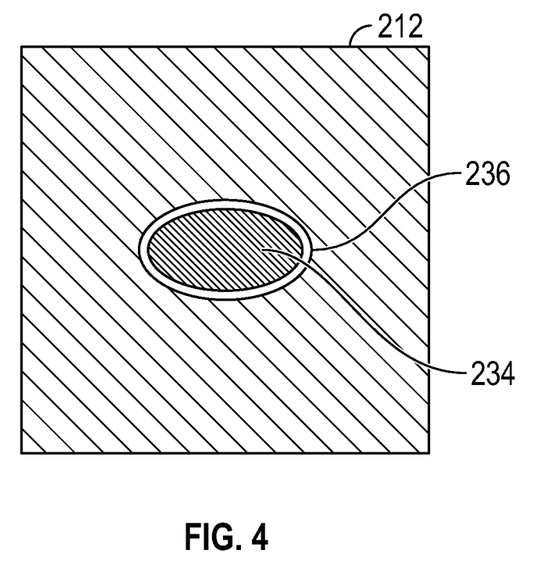
FIG. 4 is a sectional view of the tip and heated retention bolt, taken along line A-A of FIG. 3, according to one embodiment of FIG. 3.
Figure 5:
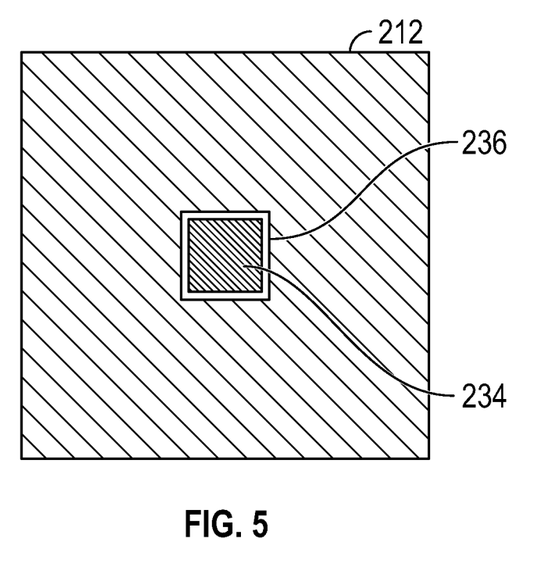
FIG. 5 is a sectional view of the tip and heated retention bolt, taken along line A-A of FIG. 3, according to another embodiment of FIG. 3.

In other embodiments, the tapered portion 232 may include a conical shape. In such a case, and as shown in FIG. 4, the retention bolt 220 may further comprise an elliptical shaft portion 234, and the cavity 218 may include at least partially an interior elliptical portion 236 extending from the enlarged interior portion 230 to the exterior 214 of the tip 212. These shapes may engage each other to prevent rotation of retention bolt during the assembly process. Also, the elliptical shaft portion 234 may extend radially inwardly through the at least partially interior elliptical portion 236 of the cavity 218 of the tip 212 and the aperture 210 of the outside surface 202. Other configurations for the shaft are possible. For example, as shown in FIG. 5, the shaft portion 234 and the interior portion 236 of the cavity 228 may be square in cross-section.

In still further embodiments, the aperture 210 of the outside surface 202 may be similarly shaped as the shaft of the retention bolt or may be oversized. Also, instead of the cavity 218 extending all the way to the side of the tip 212, a key hole shaped entry may be provided at the bottom of the tip when viewing the tip in the outwardly radial direction for receiving the retention bolt that is inserted into the enlarged portion of the key hole and then slid laterally into place, catching onto the tip radially before the shaft is inserted into the aperture of the outside surface 202.

Still looking at FIG. 3, the elliptical shaft portion 234 may terminate at the free end 224, which is cylindrical in shape and is disposed radially inwardly of the outside surface 202. In such a case, the free end 224 includes an externally threaded portion 240. A nut 242 may be threaded onto the externally threaded portion 240. So, the retention bolt 220 may be heated, then the nut 242 torqued to achieve a desired clamping force, which will then increase once the retention bolt cools after removing the heating.

In some applications, a load washer 244 (may be manufactured via a steel or iron casting process) may be disposed radially between the outside surface 202 and the nut 242 to help prevent deformation of the outside surface 202. The load washer 244 may have a convex surface that matches the radially inner concave surface 246 of the wheel 108 to help distribute the clamping load.

With continued reference to FIG. 3, a tip assembly 300 will now be discussed that may be used in the compact wheel assembly 200 described above.

The tip assembly 300 may comprise a tip 212 including a body 302 comprising a narrow tip portion 304, a broad attachment portion 306 that defines a concave surface 308, an interior 216 that is disposed radially between the broad attachment portion 306 and the narrow tip portion 304, and a cavity 218 that leads from the concave surface 308 toward the interior 216.

The tip assembly 300 may further include a retention bolt 220 including a tapered portion 232, and a shaft portion 234 extending from the tapered portion 232 terminating at an externally threaded portion 240.

The cavity 218 of the tip 212 may be at least partially complimentarily shaped to the tapered portion 232 of the retention bolt 220, while the retention bolt 220 may be configured to be heated in a manner previously described herein. For example, the retention bolt may have an aperture that is configured to receive a heat transfer element, etc.

More specifically, the cavity 218 may include an interior tapered portion 233 that is disposed in the interior 216 of the tip 212, and that is configured to mate with tapered portion 232 of the retention bolt 220.

Moreover as shown in FIG. 3, the cavity 218 may include an interior portion 236 that is configured not to rotate relative to the shaft portion 234 of the retention bolt 220. In other words, the interior portion 236 is not cylindrical, conical, etc. The shaft portion 234 may be complimentarily shaped to the interior portion 236 of the cavity 218 to prevent rotation of the retention bolt when tightening the nut 242. In such a case, the interior portion 236 of the cavity 218 may extend to the concave surface 308 of the tip 212.

As alluded to earlier herein, a nut 242 may be provided that is configured to be threaded onto the externally threaded portion 240 of the retention bolt 220. Also, a load washer 244 may also be provided that is configured to receive the shaft portion 234 of the retention bolt 220 for passing through the load washer 244. Furthermore, an induction heat element 222' may be disposed in the externally threaded portion 234 of the retention bolt 220.

During the assembly process, the retention bolt 220 is attached to the tip 212 such that the tapered portion 232 of the retention bolt 220 is disposed in the interior tapered portion 233 of the cavity 218 of the tip 212, and the shaft portion 234 of the retention bolt 220 is disposed proximate to the interior portion elliptical portion 236 of the cavity 218 of the tip 212.

Other fasteners may be used in lieu of the retention bolt such as a cap screw, a hex head bolt, a pin and cotter pin combination, etc. in other embodiments of the present disclosure.

Any of the configurations of the various features, materials, material properties, dimensions, and ratios of dimensions mentioned herein may be altered in various embodiments of the present disclosure to have different values or characteristics than what has been specifically mentioned herein or shown in the drawings.

Figure 6:
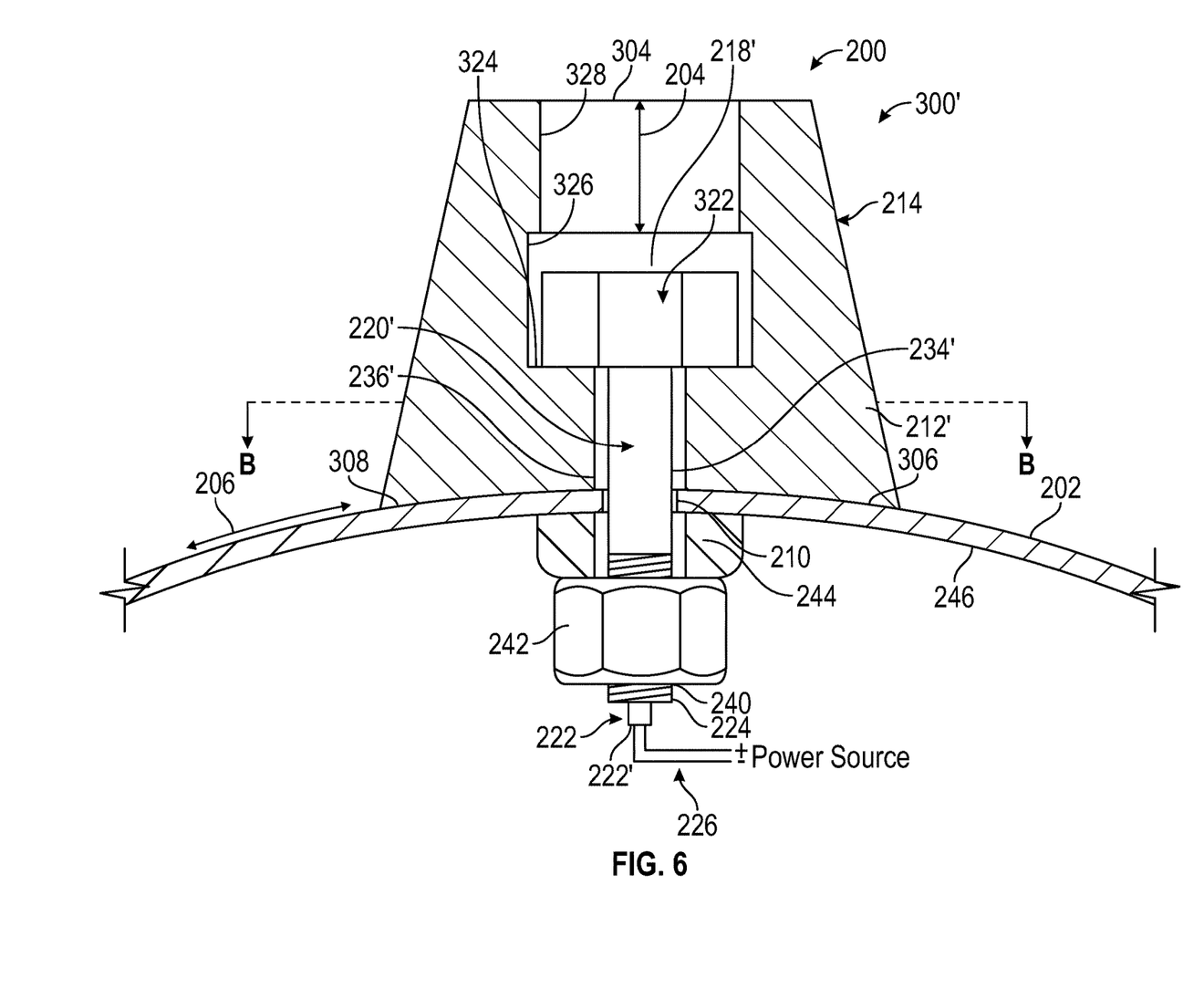
FIG. 6 is a partial sectional view of a compactor wheel, tip, and heated retention bolt of according to another embodiment of the present disclosure.

For example, an alternate embodiment of a tip assembly 300' that may be used with compactor wheel assembly 200 is shown in FIG. 6. The tip assembly 300' and its components are identically constructed and function the same way as the tip assembly 300 except for the following differences.

An enlarged head 322 in the form of a hex head is provided for the retention bolt 220'. The cavity 218' of the tip 212' is also differently configured such that it is slightly oversized compared to the enlarged head 322. However, the gap is small enough such that the hex head would contact a sidewall 326 to prevent the retention bolt 220' from turning during the fastening process. A flat bearing surface 324 is also provided onto which the hex head may press.

Figure 7:
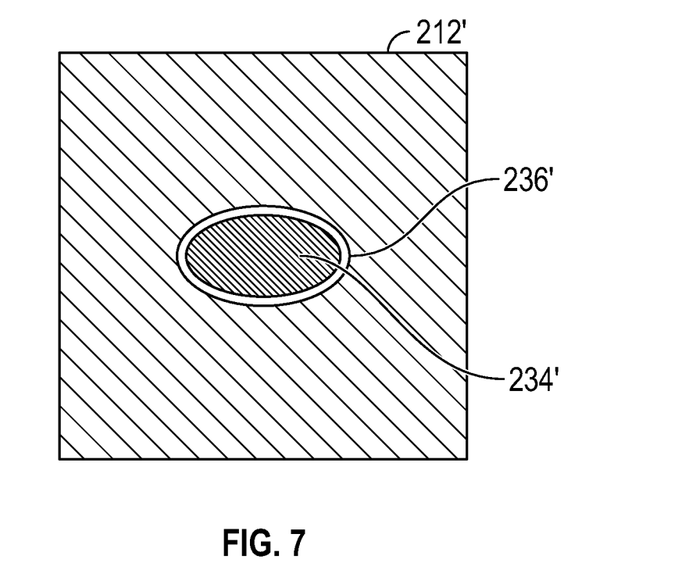
FIG. 7 is a sectional view of the tip and heated retention bolt, taken along line B-B of FIG. 6, according to one embodiment of FIG. 6.
Figure 8:
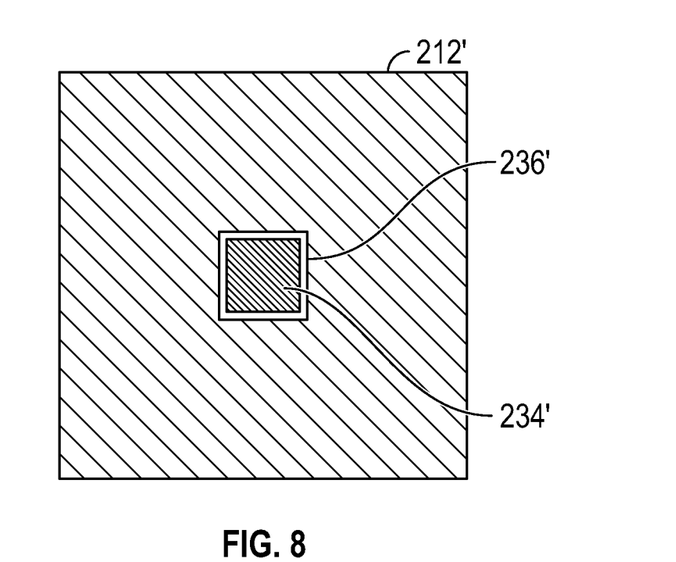
FIG. 8 is a sectional view of the tip and heated retention bolt, taken along line B-B of FIG. 6, according to another embodiment of FIG. 6.

Also, the shaft portion 234 may have anti-rotation features as mentioned previously including oval, square, elliptical, etc. to prevent the head from turning. For example, as shown in FIG. 7, the shaft portion 234' and the interior portion 236' of the cavity 218' may be elliptical in cross-section. As another example, as shown in FIG. 8, the shaft portion 234' and the interior portion 236' of the cavity 218' may be square in cross-section. The retention bolt 220' may be inserted into the tip as previously described herein. Also, a hole 328 may extend to the top of the tip to allow insertion of the retention bolt. Other variations are possible in the design as mentioned above herein.

INDUSTRIAL APPLICABILITY

In practice, a work machine, a compactor wheel assembly, a tip assembly, a tip, and/or a retention bolt according to any embodiment described herein may be sold, bought, manufactured or otherwise obtained in an OEM (original equipment manufacturer) or after-market context.

For example, the compactor wheel assembly, the tip assembly, the tip, and the retention bolt may be provided or sold as replacement parts or retrofits to machines already in the field, etc. Alternatively, a work machine such as a compactor may be sold with the compactor wheel assembly already attached to the machine, etc.

Figure 9:
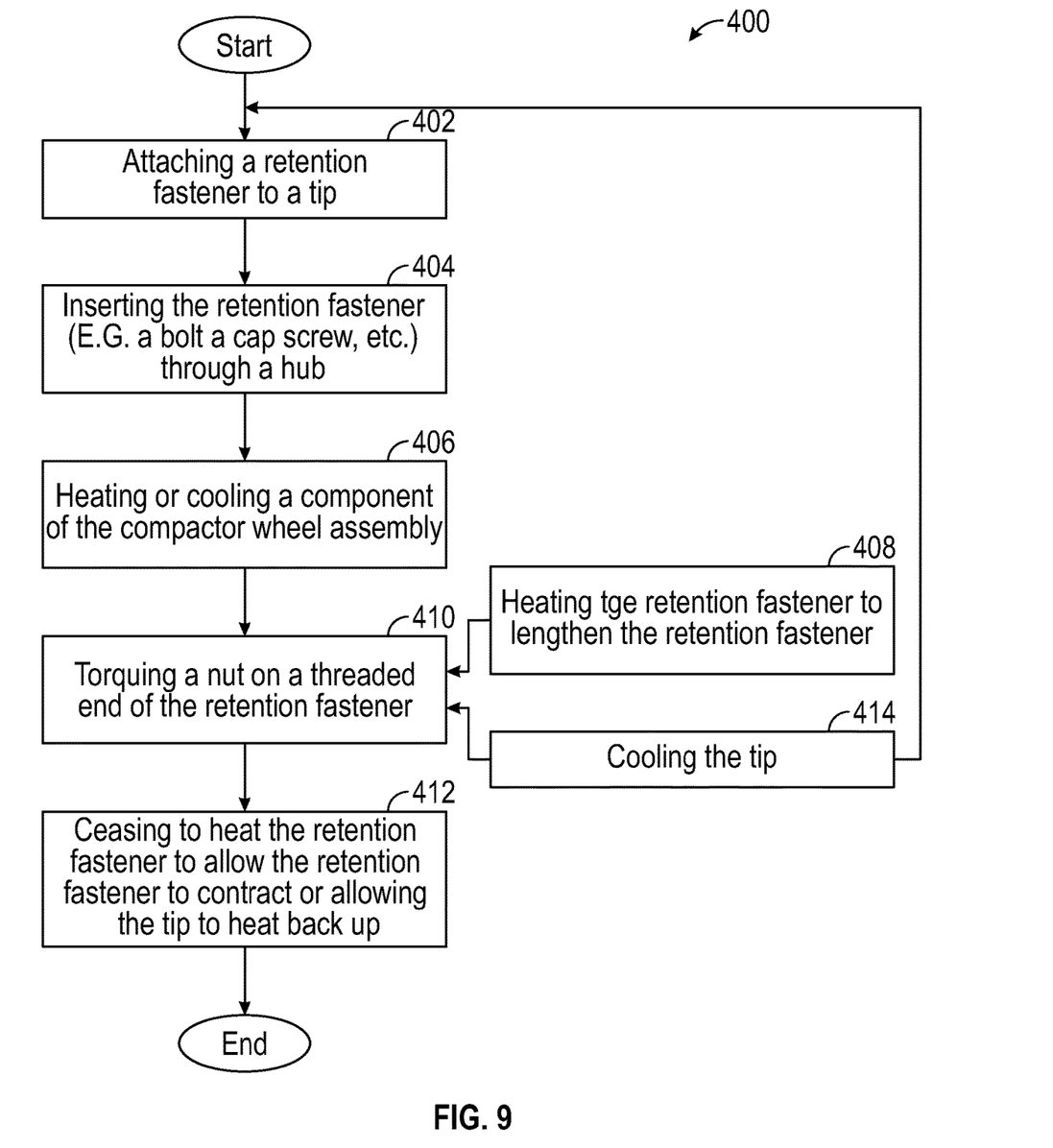
FIG. 9 contains a flow chart depicting a method for attaching a tip to a compactor wheel assembly by heating or cooling a component of the compactor wheel assembly.

A method 400 for attaching a tip to a compactor wheel assembly that may be performed in the field or at the manufacturer will now be described with reference to FIG. 9.

The method 400 may comprise attaching a retention fastener to a tip (see step 402), inserting the retention fastener (e.g. a bolt, a cap screw, etc.) through an outside surface (step 404), and heating or cooling a component of the compactor wheel assembly (step 406). These steps may be performed in any order.

In some embodiments, the step of heating or cooling a component of the compactor wheel assembly (step 406) includes heating the retention fastener to lengthen the retention fastener (step 408). In such a case, step 408 may be accomplished after steps 402 and 404.

The method 400 may further comprising torquing a nut on a threaded end of the retention fastener (step 410). In some embodiments, this step continues until a desired torque or tightness has been achieved. This step may be accomplished after step 408 but not necessarily so.

Next, the method may further comprise ceasing to heat the retention fastener to allow the retention fastener to contract (step 412). This may allow the clamping force provided by the retention fastener for holding the tip onto the outside surface to increase.

In other embodiments, the step of heating or cooling a component of the compactor wheel assembly (406) includes cooling the tip (step 414, e.g. in liquid nitrogen). In such a case, the tip may be cooled before steps 402 and 404, but not necessarily so. As the tip heats up after the nut has been torqued, the tip will expand, stretching the bolt further and increasing the clamping load.

Other variations of this method are possible in other embodiments of the present disclosure.

In certain embodiments, the retention fastener may be heated up from the inside, which then expands in length. Once it is approximately 2% longer, one skilled in the art may torque the nut on the end. Now, the fastener naturally tends to shrink back to its original size. This puts more load (like a spring, but solid) pulling the head of the fastener and the nut to a much higher load than what would be achieved from a torque tool alone.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A compactor wheel assembly comprising:
   a wheel including an aperture extending radially through an outside surface of the wheel;
   a tip including a cavity that is aligned with the aperture of the wheel, the cavity including:
      a first interior portion, and
      a second interior portion that has a width that is less than a width of the first interior portion of the cavity; and
   a retention bolt disposed in the cavity of the tip and extending from the cavity of the tip through the aperture of the wheel to attach the tip to the wheel, the retention bolt including:
      an end portion that is disposed in the first interior portion of the cavity, and
      a shaft portion that has a width that is less than a width of the end portion of the retention bolt,
         wherein the shaft portion of the retention bolt is disposed in the second interior portion of the cavity, and
         wherein the shaft portion of the retention bolt and the second interior portion of the cavity are shaped to prevent rotation of the shaft portion of the retention bolt relative to the second interior portion of the cavity.

2. The compactor wheel assembly of claim 1, wherein the end portion of the retention bolt includes a tapered portion, and
   wherein the first interior portion of the cavity includes an interior tapered portion.

3. The compactor wheel assembly of claim 2, wherein the second interior portion of the cavity extends from the first interior portion of the cavity to an exterior of the tip, and
   wherein the shaft portion of the retention bolt extends radially inwardly through the second interior portion of the cavity of the tip and through the wheel.

4. The compactor wheel assembly of claim 3, wherein the shaft portion of the retention bolt terminates at a cylindrical free end that is disposed radially inwardly of the outside surface of the wheel.

5. The compactor wheel assembly of claim 4, wherein the cylindrical free end of the retention bolt includes an externally threaded portion, and
   wherein the compactor wheel assembly further comprises a nut threaded onto the externally threaded portion of the cylindrical free end.

6. The compactor wheel assembly of claim 5, further comprising a load washer disposed radially between an inner concave surface of the wheel and the nut.

7. The compactor wheel assembly of claim 4, further comprising a heat transfer element that contacts the cylindrical free end of the retention bolt.

8. The compactor wheel assembly of claim 7, wherein the heat transfer element is an induction heating element that is connected to an electrical conduit.

9. A tip assembly comprising:
   a tip including:
      an upper portion,
      a lower attachment portion that has a width that is larger than a width of the upper portion of the tip, and
      a cavity that leads from the lower attachment portion of the tip toward the upper portion of the tip, the cavity including:
         a first interior portion, and
         a second interior portion,
            wherein the second interior portion of the cavity has a width that is less than a width of the first interior portion of the cavity; and
   a retention bolt including:
      an end portion that is configured to be disposed in the first interior portion of the cavity, and
      a shaft portion,
         wherein the shaft portion of the retention bolt has a width that is less than a width of the end portion of the retention bolt,
         wherein the shaft portion of the retention bolt is disposed in the second interior portion of the cavity,
         wherein the shaft portion of the retention bolt and the second interior portion of the cavity are shaped to prevent rotation of the shaft portion of the retention bolt relative to the second interior portion of the cavity,
         wherein the shaft portion of the retention bolt extends from the end portion of the retention bolt, and
         wherein the shaft portion of the retention bolt terminates at an externally threaded end.

10. The tip assembly of claim 9, wherein the end portion of the retention bolt includes a hex head or a tapered head.

11. The tip assembly of claim 10, wherein the shaft portion of the retention bolt is complimentarily shaped to the second interior portion of the cavity, and
   wherein the second interior portion of the cavity extends to the lower attachment portion of the tip.

12. The tip assembly of claim 11, further comprising a nut that is configured to be threaded onto the externally threaded end of the retention bolt.

13. The tip assembly of claim 12, further comprising a load washer configured to receive the shaft portion of the retention bolt.

14. The tip assembly of claim 11 wherein the first interior portion the cavity end portion of the retention bolt are tapered.

15. The tip assembly of claim 9, further comprising an induction heat element that contacts the externally threaded end of the retention bolt.

16. A method for attaching a tip to a wheel comprising:
attaching a retention fastener to a cavity of a tip,
wherein the cavity of the tip includes:
a first interior portion, and
a second interior portion that has a width that is less than a width of the first interior portion of the cavity, and
wherein the retention fastener includes:
an end portion that is disposed in the first interior portion of the cavity, and
a shaft portion that has a width that is less than a width of the end portion of the retention fastener,
wherein the shaft portion of the retention fastener is disposed in the second interior portion of the cavity, and
wherein the shaft portion of the retention bolt and the second interior portion of the cavity are shaped to prevent rotation of the shaft portion of the retention bolt relative to the second interior portion of the cavity;
inserting the retention fastener through an aperture in the wheel; and
heating or cooling the retention fastener.

17. The method of claim 16, wherein the step of heating or cooling the retention fastener includes heating the retention fastener to lengthen the retention fastener.

18. The method of claim 17, further comprising torquing a nut on a threaded end of the retention fastener,
wherein the threaded end of the retention fastener is part of the shaft portion of the retention fastener.

19. The method of claim 18, further comprising ceasing to heat the retention fastener to allow the retention fastener to contract.

20. The method of claim 16, wherein the step of heating or cooling the retention fastener includes cooling the retention fastener to shrink the retention fastener.

21. A retention bolt assembly comprising:
a retention bolt including:
an end portion; and
a shaft portion extending from the end portion of the retention bolt,
wherein the shaft portion of the retention bolt has a width that is less than a width of the end portion of the retention bolt,
wherein the shaft portion of the retention bolt is configured to be received within a cavity of a tip and is shaped to be prevented from rotating relative to the cavity of the tip, and
wherein the shaft portion of the retention bolt terminates at an externally threaded end; and
a heat transfer element contacting the externally threaded end of the retention bolt,
wherein the heat transfer element is configured to at least one of:
heat the retention bolt to cause the retention bolt to lengthen, or
cool the retention bolt to cause the retention bolt to contract.

22. A tip for connection to a wheel of a compactor wheel assembly, the tip comprising:
a body including,
an upper portion;
a lower attachment portion that defines a concave surface; and
a cavity that leads from the concave surface of the lower attachment portion toward the upper portion, the cavity including:
a first interior portion, and
a second interior portion that has a width that is less than a width of the first interior portion of the cavity,
wherein the second interior portion of the cavity is configured to receive a retention bolt and is shaped to prevent rotation of the retention bolt relative to the second interior portion of the cavity.

* * * * *